United States Patent
Bartov et al.

(10) Patent No.: US 9,952,318 B2
(45) Date of Patent: Apr. 24, 2018

(54) GROUP OF SPACED APART ACOUSTIC TRANSCEIVER ARRAYS AND A METHOD FOR MEASURING A CONTENT OF A BIN

(71) Applicant: A.P.M. AUTOMATION SOLUTIONS LTD., Tel Aviv (IL)

(72) Inventors: Avishai Bartov, Hod-Hasharon (IL); Yossi Zlotnick, Ramat-Hasharon (IL)

(73) Assignee: APM AUTOMATION SOLUTIONS LTD, Tel Tel Aviv (IL)

( * ) Notice: Subject to any disclaimer, the term of this patent is extended or adjusted under 35 U.S.C. 154(b) by 858 days.

(21) Appl. No.: 14/050,382

(22) Filed: Oct. 10, 2013

(65) Prior Publication Data

US 2015/0103627 A1     Apr. 16, 2015

(51) Int. Cl.
| | |
|---|---|
| G01S 15/00 | (2006.01) |
| G01S 7/54 | (2006.01) |
| G01S 15/10 | (2006.01) |
| G01S 15/46 | (2006.01) |
| G01S 15/87 | (2006.01) |
| G01S 15/88 | (2006.01) |
| G01S 15/89 | (2006.01) |

(52) U.S. Cl.
CPC .............. *G01S 7/54* (2013.01); *G01S 15/003* (2013.01); *G01S 15/10* (2013.01); *G01S 15/46* (2013.01); *G01S 15/878* (2013.01); *G01S 15/88* (2013.01); *G01S 15/89* (2013.01)

(58) Field of Classification Search
None
See application file for complete search history.

(56) References Cited

U.S. PATENT DOCUMENTS 4,481,517 A * 11/1984 Brown ...................... G01J 9/02
                                                    342/201
5,131,271 A *  7/1992 Haynes ............... G01F 23/2962
                                                    181/124
(Continued)

FOREIGN PATENT DOCUMENTS

CA          2759068         2/2005
DE     19860901 A1 *  7/2000   ......... G01F 23/0076
(Continued)

OTHER PUBLICATIONS

Tamai, Yuki, et al. "Sound spot generation by 128-channel surrounded speaker array." Sensor Array and Multichannel Signal Processing Workshop Proceedings, 2004. IEEE, 2004.*

(Continued)

*Primary Examiner* — Isam A Alsomiri
*Assistant Examiner* — Jonathan D Armstrong
(74) *Attorney, Agent, or Firm* — Reches Patents

(57) ABSTRACT

A method and a system for evaluating a content of a bin, the method may include: transmitting at a first point in time and by a first acoustic transceiver array, a first acoustic pulse; receiving by a second acoustic transceiver array an echo of the first acoustic pulse; and processing the echo of the first acoustic pulse to assist in a provision of a first estimate related to the content; wherein the second acoustic transceiver array differs from the first transceiver array; wherein a distance between the first and second acoustic transceiver array is at least ten times a distance between transducers of the second acoustic transceiver array.

22 Claims, 9 Drawing Sheets

(56) References Cited

U.S. PATENT DOCUMENTS

| | | | | |
|---|---|---|---|---|
| 5,337,289 | A * | 8/1994 | Fasching | G01F 23/2962 340/612 |
| 5,474,072 | A * | 12/1995 | Shmulewitz | A61B 6/502 128/915 |
| 5,619,423 | A * | 4/1997 | Scrantz | G01N 29/2412 324/220 |
| 6,055,214 | A * | 4/2000 | Wilk | G01S 7/521 367/99 |
| 6,282,526 | B1 * | 8/2001 | Ganesh | G06N 7/02 342/13 |
| 6,581,459 | B1 | 6/2003 | Lichtenfels, II | |
| 6,634,234 | B1 * | 10/2003 | Haas | G01F 23/284 367/138 |
| 6,986,294 | B2 | 1/2006 | Fromme et al. | |
| 6,987,707 | B2 * | 1/2006 | Feintuch | G01S 15/04 367/87 |
| 8,040,272 | B1 | 10/2011 | Clodfelter et al. | |
| 8,611,187 | B2 * | 12/2013 | Bis | E21F 17/18 340/870.07 |
| 2004/0143176 | A1 * | 7/2004 | Foxlin | G01C 21/165 600/395 |
| 2004/0173021 | A1 | 9/2004 | Lizon | |
| 2007/0159924 | A1 * | 7/2007 | Vook | G01S 5/28 367/127 |
| 2009/0007627 | A1 * | 1/2009 | Perl | G01F 23/2962 73/1.73 |
| 2012/0155584 | A1 * | 6/2012 | Wilkinson | G04G 7/00 375/354 |
| 2012/0287749 | A1 * | 11/2012 | Kutlik | G01H 3/125 367/7 |
| 2014/0207412 | A1 | 7/2014 | Bartov | |

FOREIGN PATENT DOCUMENTS

| | | | |
|---|---|---|---|
| DE | 10106176 | 8/2002 | |
| EP | 1853881 A2 * | 11/2007 | G01F 23/2962 |
| JP | S6022624 | 2/1985 | |
| JP | 2001330500 | 11/2001 | |
| JP | 2008304320 | 12/2008 | |
| KR | 20020016008 | 3/2002 | |
| WO | WO0160718 | 8/2001 | |
| WO | WO 0160718 A2 * | 8/2001 | G01B 11/24 |
| WO | WO 03079047 A2 * | 9/2003 | G01S 7/52047 |
| WO | WO 2006090394 A2 * | 8/2006 | G01F 23/2962 |
| WO | WO2007077079 | 7/2007 | |
| WO | WO 2015052698 A1 * | 4/2015 | G01F 23/296 |

OTHER PUBLICATIONS

Gan, Tat Hean, Prakash Pallav, and David A. Hutchins. "Non-contact ultrasonic quality measurements of food products." Journal of Food Engineering 77.2 (2006): 239-247.*

Pallav, P., David A. Hutchins, and T. H. Gan. "Air-coupled ultrasonic evaluation of food materials." Ultrasonics 49.2 (2009): 244-253.*

Flanagan, J. L., et al. "Computer-steered microphone arrays for sound transduction in large rooms." The Journal of the Acoustical Society of America 78.5 (1985): 1508-1518.*

Pollow, Martin, Gottfried Behler, and Bruno Masiero. "Measuring directivities of natural sound sources with a spherical microphone array." Proceedings of the 1st Ambisonics Symposium Graz. 2009.*

Lokki, Tapio, et al. "Concert hall acoustics assessment with individually elicited attributes." The Journal of the Acoustical Society of America 130.2 (2011): 835-849.*

Barshan, Billur, and Deniz Baskent. "Comparison of two methods of surface profile extraction from multiple ultrasonic range measurements." Measurement Science and Technology 11.6 (2000): 833.*

Caicedo, David, and Ashish Pandharipande. "Distributed ultrasonic zoned presence sensing system." IEEE Sensors Journal 14.1 (2013): 234-243.*

Vasudevan, Sud. Ultrasonic Digital Beamformation: A Comparative Study. vol. 14. Sep. 1998.*

NDT Resource Center. Ultrasonic Formula. URL: [https://www.nde-ed.org/GeneralResources/Formula/UTFormula/ultrasonicPrint.pdf]. Retrieved Mar. 24, 2017. 2003.*

* cited by examiner

GROUP OF SPACED APART ACOUSTIC TRANSCEIVER ARRAYS AND A METHOD FOR MEASURING A CONTENT OF A BIN

BACKGROUND OF THE INVENTION

The monitoring of liquid inventory generally is straightforward. By contrast, the monitoring of bulk solid inventory that consists of particulates piled up inside a bin such as a silo often is very difficult. Examples of such bulk solid inventory include cement and sand for construction, grain, fertilizer, etc. The measurement of the level of bulk materials inside a bin is a problem that has not yet been solved adequately. The conditions inside bins typically are unfavorable (dust, extreme temperatures, etc.) and the contents of the bulk material stored in the bins often do not have a flat surface and are not always isotropic. Other difficulties arise from the wide variety of bin shapes in use and from the explosive atmospheres inside some bins.

The scope of the term "bin" as used herein includes any storage container, for bulk particulate solids, whose structure defines an interior volume for receiving and storing the solids. Such a bin may be closed above, below and on all sides, as is the case when the bin is a silo, vessel or tank, or may be open above or on one or more sides. The example of a "bin" that is used in the detailed description of the present invention below is a silo; but it will be obvious to those skilled in the art how to apply the principles of the present invention to any type of bin.

Five principal methods are known for continuous measurement of the content of a bin such as a silo.

An electromechanical (yo-yo) level sensor consists essentially of a weight at one end of a reel of tape. The weight is allowed to descend in the silo to the depth at which the top surface of the content is situated. When the weight settles on top of the content, the tension in the tape slackens. The weight then is retracted to the top set point. The height of the content is inferred from the time required to retract the weight or from the measured tape length.

Mechanical devices such as yo-yo sensors are unreliable. They tend to get clogged by dust and to get stuck on obstacles such as pumps and rods inside the silos.

Ultrasonic level sensors work on the principle of ultrasonic sound wave transmission and reception. High frequency sound waves from a transmitter are reflected by the top surface of the content to a receiver. The height of the content is inferred from the round-trip travel time. Such sensors have limited range and work poorly in the presence of dust. In addition, such devices need to be custom-designed for different types of silo.

Radar level sensors work on the principle of electromagnetic wave transmission and reception. Electromagnetic waves from a transmitter are reflected by the top surface of the content to a receiver. The height of the content is inferred from the round-trip travel time. Such sensors have a single point of measurement that is not suited for bulk solids.

Capacitance sensors measure the capacitance between two metallic rods or between a metallic rod and the ground. Because the silo content has a different dielectric constant than air, the capacitance changes according to the level of the top surface of the content between the two rods or between a rod and the ground. Such sensors tend to be inaccurate and are sensitive to humidity and to type of material stored in the silo.

All the prior art sensors discussed above are insensitive to the shape of the contents, and so are inaccurate in the presence of a common phenomenon called "coning" that occurs as bulk particulate solids are withdrawn via the base of a bin: an inverted conical hole, whose apex is directly above the point of withdrawal, tends to form in the bulk particulate solids. A similar phenomenon occurs as bulk particulate solids are added to a bin from the top: the solids tend to pile up in a cone whose apex is directly below the point of insertion of the solids. These sensors also work poorly in bins with complicated geometries and in the presence of obstacles.

A weight gauge measures the weight of a mobile silo and its content by measuring the tension in the rods that hold the silo. Installation of such gauges is complex, and they are suitable only for mobile silos with metallic legs.

There is thus a widely recognized need for, and it would be highly advantageous to have, a method of measuring the content of a bin and especially detect obstacles and would overcome the disadvantages of presently known methods as described above.

SUMMARY OF THE INVENTION

There are provided systems and methods for evaluating a content of a bin.

According to an embodiment of the invention there may be provided a method for evaluating a content of a bin, the method may include (a) transmitting at a first point in time and by a first acoustic transceiver array, a first acoustic pulse; (b) receiving by a second acoustic transceiver array an echo of the first acoustic pulse; and (c) processing the echo of the first acoustic pulse to assist in a provision of a first estimate related to the content. The second acoustic transceiver array differs from the first transceiver array.

The first and second transceiver arrays are spaced apart from each other so that they receive echoes from the same reflecting point at substantially different angles. For example—the distance between the first and second acoustic transceiver array is at least ten times a distance between transducers of the second acoustic transceiver array. In other words—the first and second acoustic transceiver array cannot be regarded as forming a single phased array as they are too spaced apart from each other.

The method may include receiving another echo of the first acoustic pulse by the first acoustic transceiver array; and processing the other echo of the first acoustic pulse to assist in a provision of a second estimate related to the content.

The method further may include transmitting at a second point in time and by the second acoustic transceiver array, a second acoustic pulse; wherein the second point in time differs from the first point in time; receiving by the first acoustic transceiver array an echo of the second acoustic pulse; and processing the echo of the second acoustic pulse to assist in a provision of a third estimate related to the content.

The method may include receiving another echo of the second acoustic pulse by at least one additional acoustic transceiver array; and processing the other echo of the second acoustic pulse to assist in a provision of a fourth estimate related to the content.

The first estimate may be an estimate of a location of a first reflecting point that (a) belongs to an upper surface of the content and (b) reflected the first acoustic pulse; wherein the processing may include estimating the location of the first reflecting point in response to (i) a spatial relationship between the first and second acoustic transceiver arrays, to (ii) a time gap between a transmission of the first acoustic pulse and the reception of the echo of the first acoustic transceiver array, and to (iii) a direction of arrival of the echo to the second acoustic transceiver array.

The method may include compensating for clock differences between a second clock of the second acoustic transceiver array and a master clock.

The compensating may include receiving by the second acoustic transceiver array multiple master clock time stamps; determining a compensated value of a second clock time stamp in response to values of the multiple master clock time stamps and timings of receiving of the multiple master clock time stamps; and setting the second clock to the compensated value.

The compensating may include calculating by the second acoustic transceiver array a gap between a rate of the second clock and a rate of the first clock in response to the multiple master clock time stamps and in response to the timings of the receiving of the multiple master clock stamps.

The upper surface of the content is expected to be located within a far field of each one of the first and second transceiver arrays.

The first acoustic pulse may have a shape of a lobe that is more than forty degrees wide.

According to an embodiment of the invention there may be provided a system for evaluating a content of a bin, the system may include (a) a first acoustic transceiver array that is arranged to transmit at a first point in time a first acoustic pulse; and (b) a second acoustic transceiver array that is arranged to receive an echo of the first acoustic pulse. The second transceiver array is arranged to process the echo of the first acoustic pulse to assist in a provision of a first estimate related to the content. The second acoustic transceiver array differs from the first acoustic transceiver array and the first and second transceiver arrays may be spaced apart from each other. For example—a distance between the first and second acoustic transceiver array is at least ten times a distance between transducers of the second acoustic transceiver array.

The first acoustic transceiver array may be arranged to receive another echo of the first acoustic pulse and to process the other echo of the first acoustic pulse to assist in a provision of a second estimate related to the content.

The second acoustic transceiver array may be arranged to transmit at a second point in time a second acoustic pulse; wherein the second point in time differs from the first point in time; wherein the first acoustic transceiver array may be arranged to receive an echo of the second acoustic pulse and process the echo of the second acoustic pulse to assist in a provision of a third estimate related to the content.

The system may include at least one additional acoustic transceiver array that may be arranged to receiving another echo of the first acoustic pulse; and process the other echo of the first acoustic pulse to assist in a provision of a fourth estimate related to the content.

The first estimate may be an estimate of a location of a first reflecting point that (a) belongs to an upper surface of the content and (b) reflected the first acoustic pulse. The first acoustic transceiver array may be arranged to assist in an estimation of the location of the first reflecting point in response to (i) a spatial relationship between the first and second acoustic transceiver arrays, to (ii) a time gap between a transmission of the first acoustic pulse and the reception of the echo of the first acoustic transceiver array, and to (iii) a direction of arrival of the echo to the second acoustic transceiver array.

The second acoustic transceiver array may be arranged to compensate for to clock differences between a second clock of the second acoustic transceiver array and a master clock.

The second acoustic transceiver array may be arranged to receive multiple master clock time stamps; determine a compensated value of a second clock time stamp in response to values of the multiple master clock time stamps and timings of receiving of the multiple master clock time stamps; and set the second clock to the compensated value The second acoustic transceiver array may be arranged to calculate a gap between a rate of the second clock and a rate of the first clock in response to the multiple master clock time stamps and in response to the timings of the receiving of the multiple master clock stamps.

The master clock may be generated by a controller that is coupled to the first and second acoustic transceiver arrays.

The upper surface of the content is expected to be located within a far field of each one of the first and second transceiver arrays.

The system may include a controller that may be arranged to receive the first and second estimates related to the content and to provide an updated estimate related to the content.

The first acoustic pulse may have a shape of a lobe that is more that forty degrees wide.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
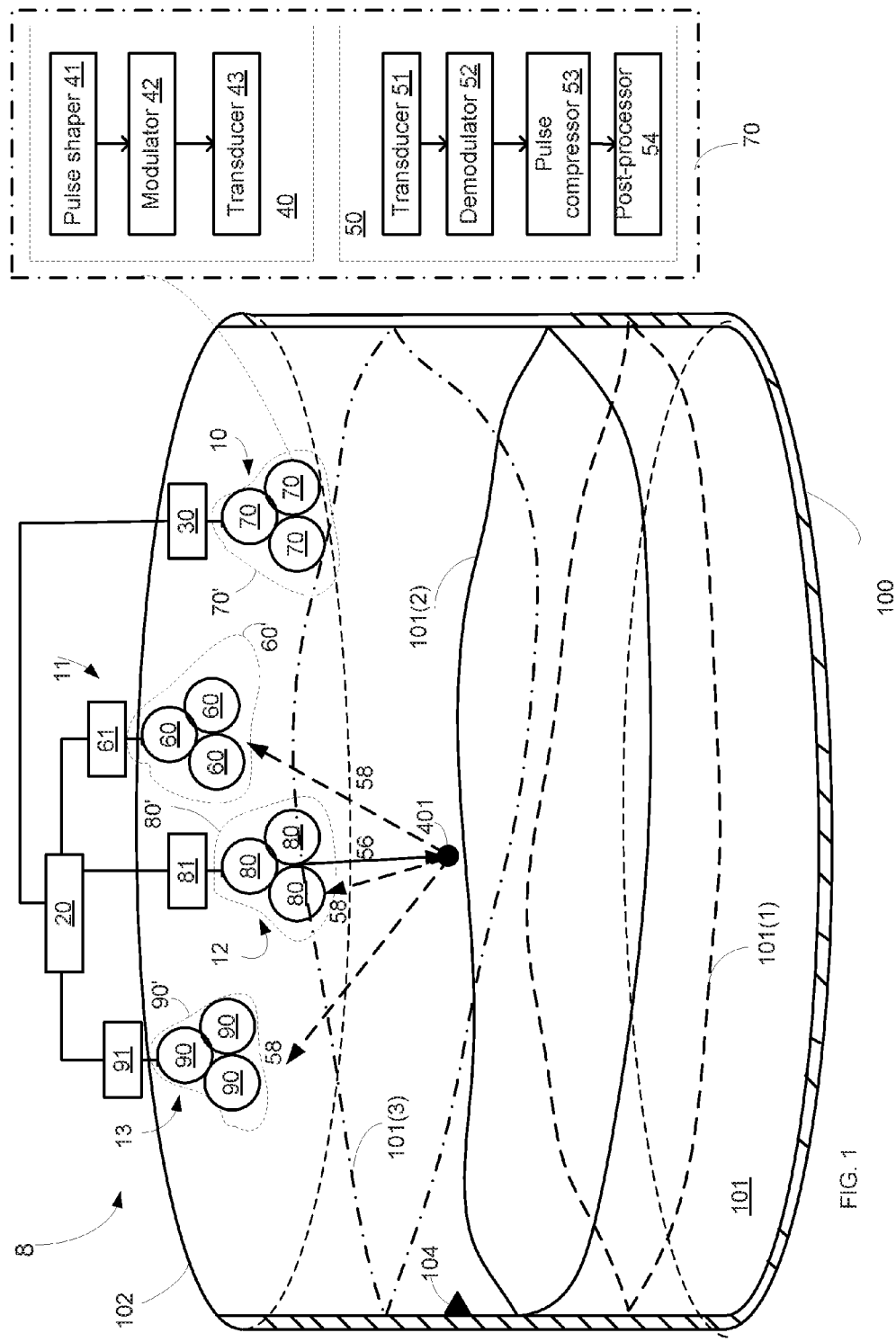
FIG. 1 is a partially cut-away view of a silo with a system mounted on the ceiling of the silo according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

The present invention is of a system for providing an estimate relating to the content stored in a bin. The estimate can relate to the quantity of the content, the distribution of the content within the bin and the like.

The principles and operation of content measuring according to the present invention may be better understood with reference to the drawings and the accompanying description.

The system includes two or more spaced apart acoustic transceiver arrays. The acoustic transceiver arrays are spaced apart in the sense that they receive echoes from the same reflecting point at substantially different angles. These angles may differ from each other by multiple degrees (for example by at least ten, twenty, thirty or more degrees) and not by a fraction of a degree. The distance between spaced apart acoustic transceiver arrays can be few meters and the distance between each acoustic transceiver array and the content of the bin can also be few meters.

The difference between these angles is large enough so that there may be cases that echoes of the same acoustic pulse will be collected by only some of the acoustic transceiver arrays.

Figure 3:
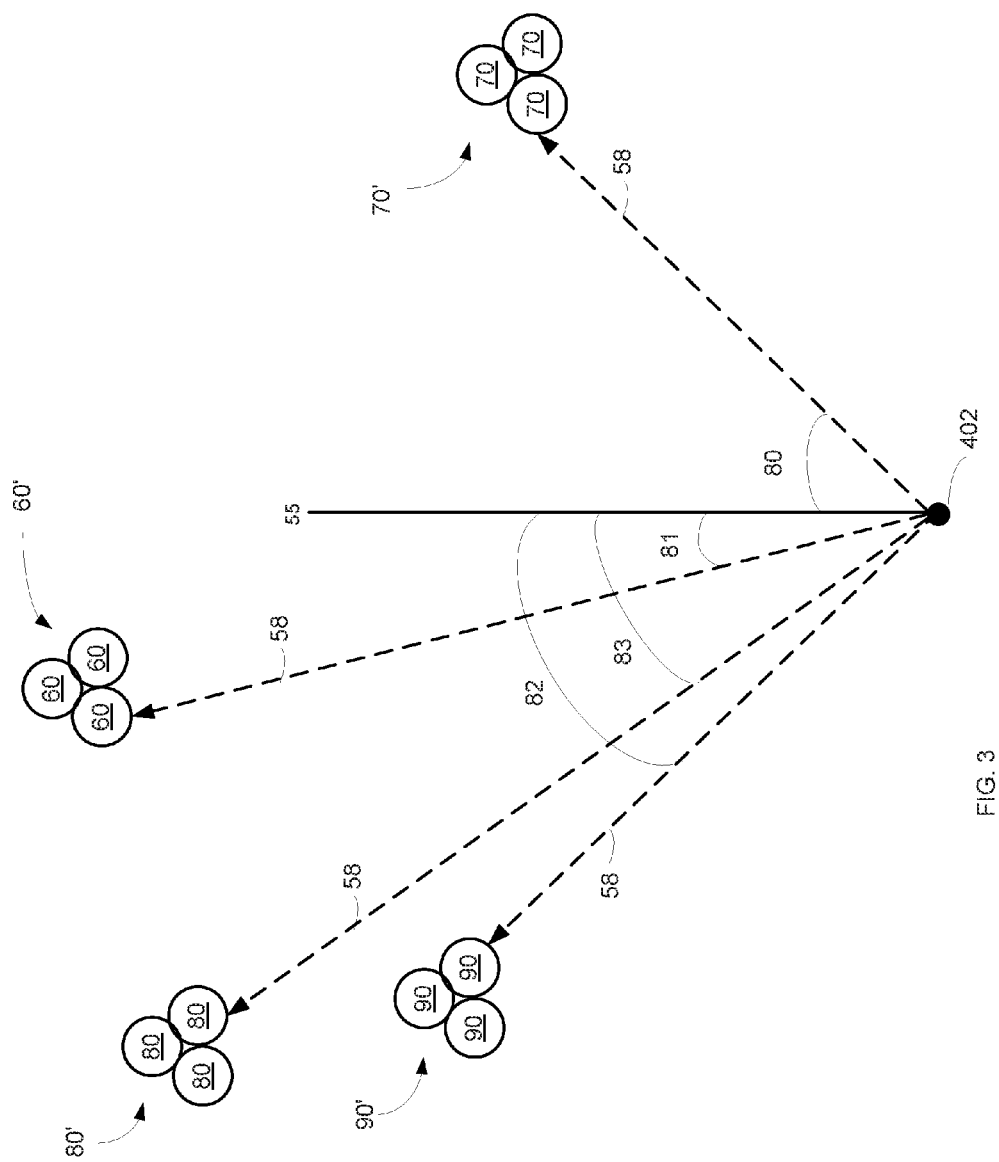
FIG. 3. illustrates the spatial relationships between the center of the collection fields of different transceiver arrays of the system of FIG. 1 according to an embodiment of the invention.

FIG. 3 illustrates angles 80, 81, 82 and 83 formed between an imaginary vertical line 55 extending from a reflecting point of an upper surface of a content of a bin and between four transducers arrays 70, 60, 80 and 90. These angles substantially differ from each other.

For example—the distance between the spaced apart acoustic transceiver arrays is at least ten times a distance between transducers of the same acoustic transceiver array.

The spaced apart acoustic transducer arrays cannot be regarded as forming a single phased array as they are too spaced apart from each other.

The phrase "towards the upper surface of the content" can mean that the acoustic pulse can be directed towards a location in which there may be expected to be content at least at a certain fullness level of the bin. The change in the fullness level does not necessarily change the direction of illumination that may be fixed. Thus when the content level changes the direction of transmission does not change. In various figures it may be assumed that the acoustic pulse is directed at a certain direction that causes the acoustic pulse to be directed towards the upper surface (90(1), 90(2) and 90(3)) of content 80 of silo 100.

The content of the bin is expected to be within the far field of each of the acoustic transducer arrays.

Figure 4:
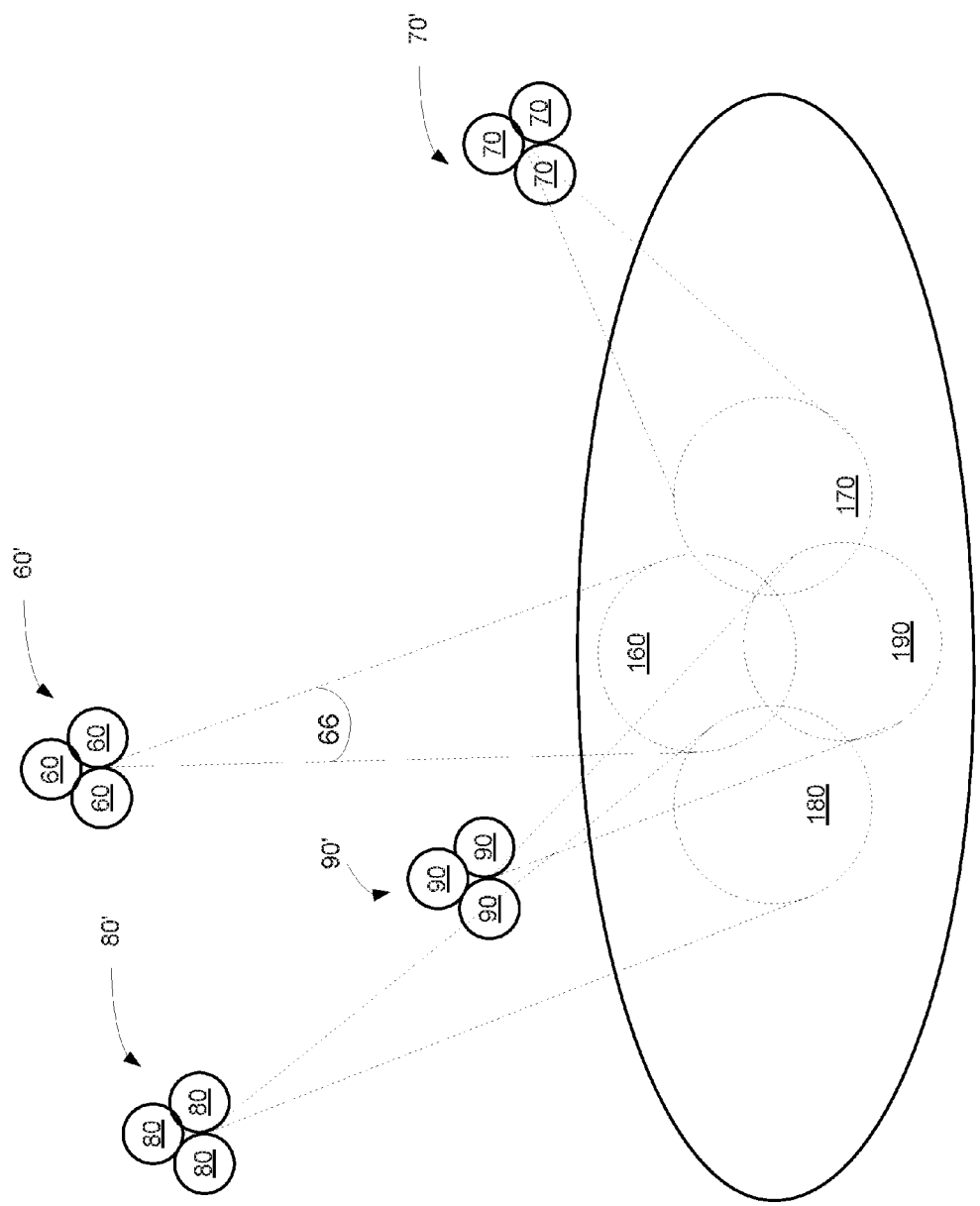
FIG. 4. illustrates the spatial relationships between the areas illuminated by different transceiver arrays of the system of FIG. 1 according to an embodiment of the invention.

The fields of view of the different spaced apart acoustic transducer arrays may partially overlap—as illustrated in FIG. 4 showing fields of view 170, 160, 180 and 190 of acoustic transducer arrays 70', 60', 80' and 90' respectively.

Figure 2:
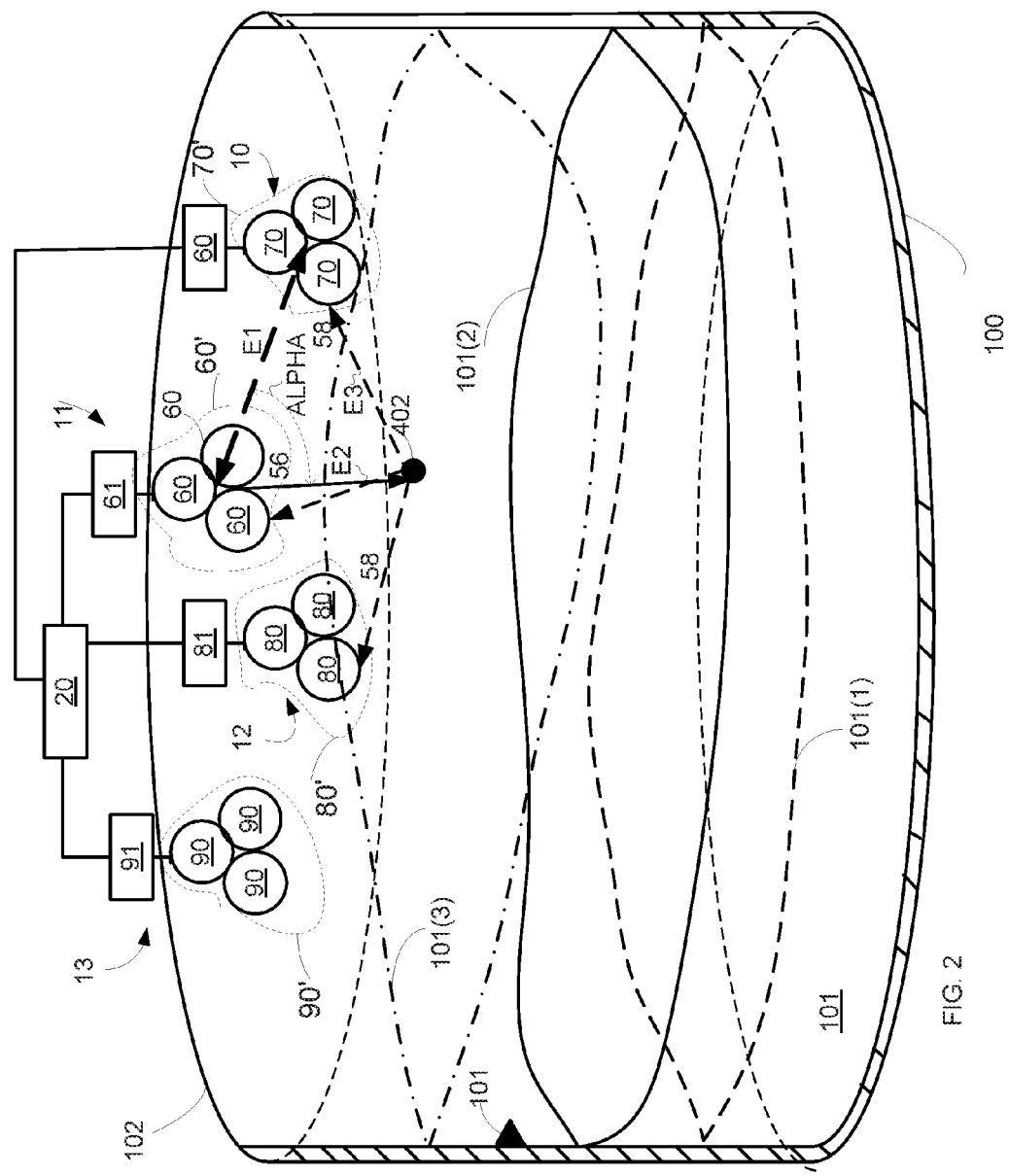
FIG. 2 is a partially cut-away view of a silo with a system mounted on the ceiling of the silo according to an embodiment of the invention.

FIGS. 1 and 2 are partially cut-away views of a silo 100 with a system 8 that includes four acoustic detection devices 10-13 and a controller 20, according to various embodiments of the invention.

Each detection system has a processor and an array of acoustic transducers. Detection system 10 includes processor 71 and an acoustic transducer array 70' that includes three acoustic transducers 70. Detection system 11 includes processor 61 and an acoustic transducer array 60' that includes three acoustic transducers 60. Detection system 12 includes processor 81 and an acoustic transducer array that includes three acoustic transducers 80. Detection system 13 includes processor 91 and an acoustic transducer array 90' that includes three acoustic transducers 90.

The processors 71, 61, 81 and 91 may be electrically connected to their corresponding acoustic transducer arrays and/or to each other via wire or via a wireless manner. The locations of the processors in relation to each other can be regarded as being less significant that the spatial relationship between the spaced apart acoustic transducer arrays. Therefore, and for brevity of explanation, the following text may refer to the locations of the acoustic transducer arrays and not to the locations of the detection systems.

It is noted that the system 8 may include multiple spaced apart acoustic transceivers and that the four acoustic transceivers of FIGS. 1-4 and 6 are only a non-limiting example of a group that includes four acoustic transceivers. The system 8 may have any number of acoustic transceivers—two acoustic transceivers or more acoustic transceivers.

Furthermore—although FIGS. 1-7 illustrate that each acoustic transceiver includes three acoustic transducers, it is noted that one or more acoustic transceiver may include another number of acoustic transceivers. The different acoustic transceiver arrays may have the same number of acoustic transceivers or may differ from each other by the number of acoustic transceivers. A non-limiting example of such acoustic transceiver arrays is illustrated in U.S. Pat. No. 8,091,421 which is incorporated herein by reference.

Additionally or alternatively, one or more acoustic transceivers may include the same acoustic transducers or may differ from each other by the size and/or shape of the acoustic transducers.

Additionally or alternatively, one or more acoustic transceivers may have the same radiation patterns or differ from each other by their radiation patterns.

In any case each one of the acoustic transceiver includes transducers with large radiation patterns. These radiation patterns are larger that corresponding laser, ultrasonic and radar pulses. The transmitted pulses may be shaped as lobes that are wider than forty, fifty, sixty, seventy and even more degrees. A non-limiting example of such an angle is provided by angle 66 of FIG. 4.

The acoustic transducer arrays of acoustic detection systems 10-13 is mounted on the ceiling 102 of silo 100 and facing an upper surface of content 80.

FIG. 1 illustrates the upper surface 101(1), 101(2) and 101(3) of the content at three points of times during a content changing process (filling content or emptying process), according to an embodiment of the invention. Upper surface 101(1) is lower than upper surface 101(2), and upper surface 101(2) is lower than upper surface 101(3).

System 8 may define the bottom of the silo 100 as a set of points that were estimated to have the lowest estimated height out of points illuminated by the system 8 over time.

System 8 may receive at least partial information about the silo—for example its dimensions—or at least its cross section dimension.

Each acoustic transceiver array (of acoustic detection systems 10-13) includes multiple (such as three) acoustic transceivers (70, 60, 80 and 90 respectively) that are proximate to each other and also includes a processor (71, 61, 81 and 91 respectively).

The controller 20 may control the transmission windows of the different acoustic transceiver arrays so that the acoustic transceiver arrays transmit acoustic pulses in a non-overlapping manner—so that at any given point of time only up to a single acoustic transceiver array transmits an acoustic pulse.

Additionally or alternatively, one or more of the acoustic transceiver can control the timing of transmissions. The acoustic transceiver may apply a distributed control mechanism to determine when each acoustic transceiver transmits its acoustic pulses so in order to prevent overlapping transmission of acoustic pluses by different acoustic transceivers.

Each acoustic transceiver of each array includes a transmitter and a receiver. FIG. 1 illustrates acoustic detection system 10 as including processor 30 and three acoustic transceivers 70 and further instates an acoustic transceiver 70 as including receiver 50 and transmitter 40.

The transmitter 50 may be arranged to transmit pulses of acoustic energy that may might be wide enough to cover, without scanning relatively large areas of the upper surface of the content—in comparison to much narrower areas that can be covered by narrow cross section radio frequency or narrow cross section (aperture of about 10 degrees) ultrasonic waves.

It is further noted that the invention can be applicable mutatis mutandis to large (aperture of about 60-80 degrees) cross section radio frequency pulses (for example about 1 Ghz radio frequency pulses) or to scanning systems using radio frequency or scanning systems using ultrasonic waves. The pulses of acoustic energy can have a frequency between 2-7 KHertz.

It is noted that the number of transceiver arrays can differ from three.

Each acoustic transceiver an acoustic transceiver array may include a transmission path and a reception path. The transmission path (transmitter—denoted 40) may include a pulse shaper 41, a modulator 42 and a transducer (speaker) 43 while the reception path (receiver—denoted 50) can include a transducer (microphone) 51, a demodulator 52, a pulse compressor 53 and a post processor 54 such as those illustrated in US patent application titled "Variable length ranging and direction-finding signals constructed from beamlimited kernals and sparse spreading sequences", having a Ser. No. 13/041,461 filing date Mar. 7, 2011 which is incorporated herein by reference.

Pulse shaper 41 generates a baseband pulse from a kernel. Modulator 42 modulates a carrier wave with the baseband pulse. Transducer 43 launches modulated carrier wave, into a medium that supports propagation of the carrier wave, as a transmitted acoustic pulse 56, towards the upper surface (101(1), 101(2) and 101(3)) of the content.

Echo 58 is reflected from the upper surface (101(1), 101(2) and 101(3)) and may be received by acoustic transceiver arrays of acoustic transceiver 10 and by one or more transducers of acoustic transceivers (60, 80 and 90) of acoustic transceivers 11, 12 and 13 respectively.

Transducer 51 may receive echoes of acoustic pulses transmitted by transducer 43 of acoustic transceiver array 70' or by a transducer of any other acoustic transceiver array 60', 80' and 90'.

Demodulator 52 demodulates the echo to provide a received representation of the baseband pulse.

Pulse compressor 53 compresses the representation of the baseband pulse by de-convolution. The pulse compression provides a compressed pulse that is a time-shifted representation of the original kernel. Post-processor 54 applies post-processing the compressed pulse and infers the range to a point of the upper surface 101(1), 101(2) or 101(3)) as one-half of the product of the round-trip travel time of acoustic pulse 56 and echo 58 and the propagation speed of signals 34 and 36 in medium 30.

According to another embodiment of the invention the processing is only partially done by the acoustic detection devices and it is at least partially done by controller 20. Controller 20 can merge information received from different acoustic detection devices 10-13 to provide a better estimate of the content of the bin.

The directional information is obtaining by using different combinations of acoustic transceiver arrays to transmit acoustic pulses and receive echoes.

One or more acoustic transceiver arrays may function at any given point of time as transmitters and may emit a pulse of acoustic energy (acoustic pulse) 56 towards the interior of the bin. The acoustic pulse can be directed towards a location in which there may be expected to be content at least at a certain fullness level of the bin. The change in the fullness level does not change the direction of illumination that may be fixed. Thus when the content level changes the direction of transmission does not change. In FIG. 1 it may be assumed that the acoustic pulse is directed at a certain direction that causes the acoustic pulse to be directed towards the upper surface (101(1), 101(2) and 101(3)) of content 80 of silo 100.

Acoustic pulse 56 is represented symbolically in FIG. 1 as an arrow emerging from acoustic transceiver 80. An echo of acoustic pulse 56 that is reflected from upper surface (90(1), 90(2) and 90(3)) back towards acoustic transceivers 80, 60 and 90 of acoustic detection systems 11-13. These echoes are represented in FIG. 1 by dashed arrows 58.

In FIG. 2 the acoustic pulse emerges from acoustic transceiver 60 and echoes are reflected back towards acoustic transceivers 60, 70 and 80 of acoustic detection systems 10-12.

The detection of echoes depend upon the field of view of the different acoustic transceiver arrays and on the spatial and reflection characteristic of the area of the upper surface of the content that is illuminated by the acoustic pulse.

Echo 58 is received by acoustic transceiver arrays functioning as receivers that in turn are capable of generating detection signals representative of the shape of the upper surface (101(1), 101(2) and 101(3)) of content 80 at three points in time.

The detection signals may be responsive to the time of arrival of the echo, relationships between time of arrival of the echo to different transceiver arrays, and the spatial arrangement of the acoustic transceiver arrays.

It is noted that transmitter 40 is arranged to direct radiation pulses towards an interior of the bin at different points of time during an content changing process selected out of an emptying process of the content and a filling process of the content; receiver 50 is arranged to receive echoes of the radiation pulses and to generate detection signals that are indicative of a time of arrival and of a direction of arrival of the echoes.

Figure 5:
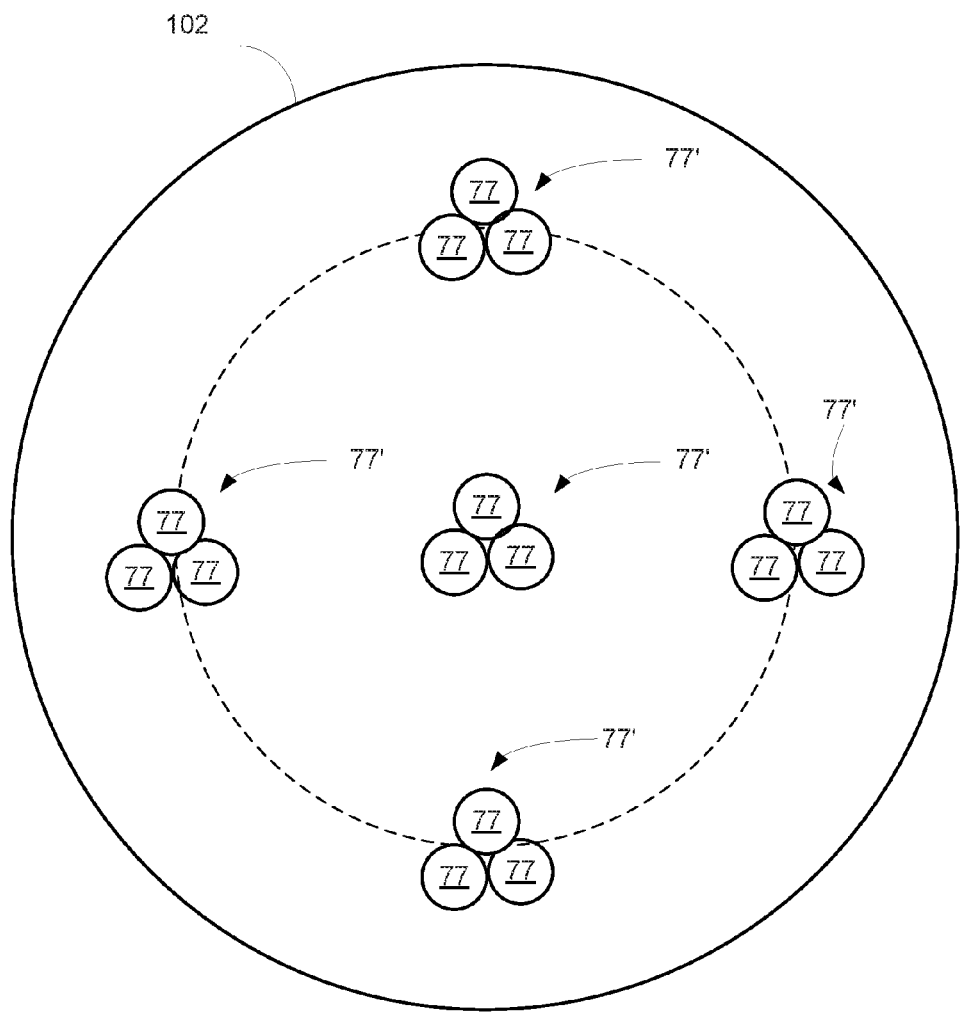
FIG. 5 is a top view of a silo and multiple acoustic transceiver arrays of system mounted on the ceiling of the silo according to an embodiment of the invention.
Figure 6:
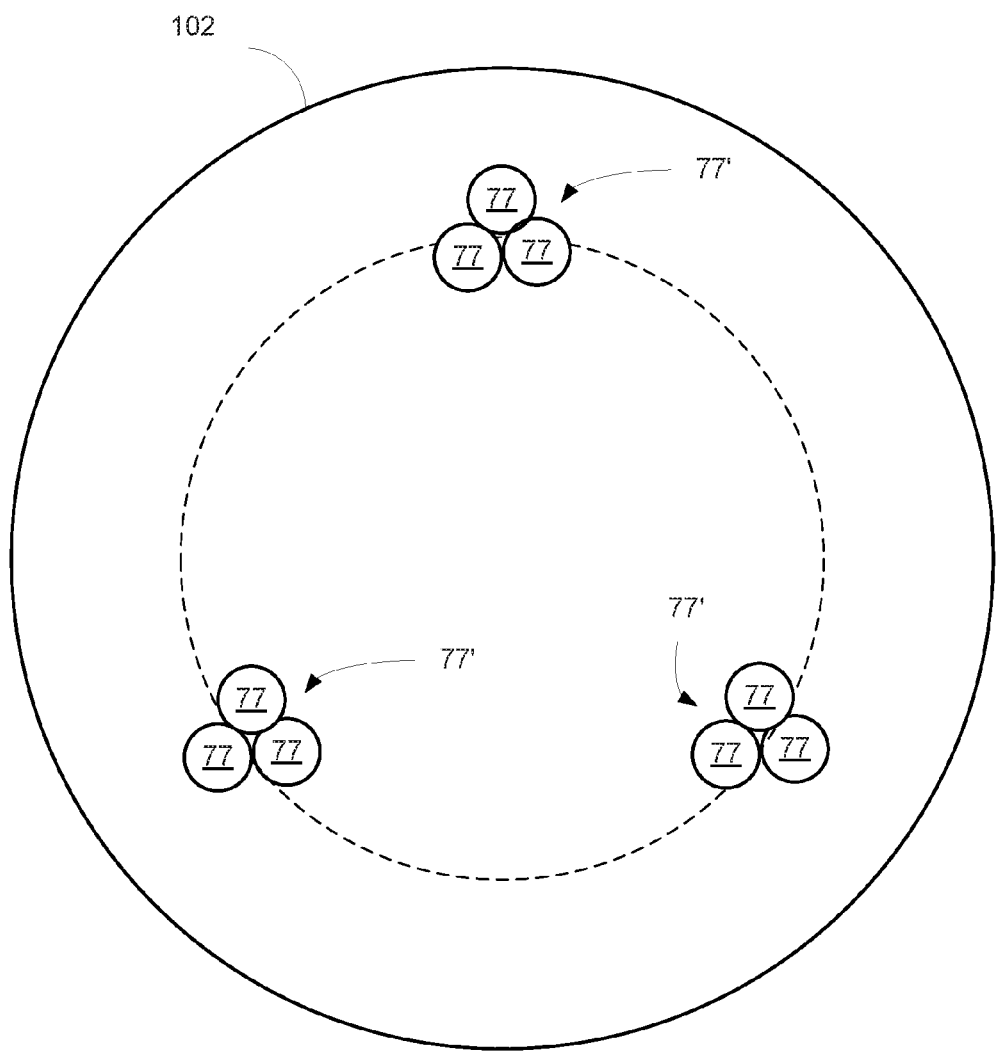
FIG. 6 is a top view of a silo and multiple acoustic transceiver arrays of system mounted on the ceiling of the silo according to an embodiment of the invention.
Figure 7:
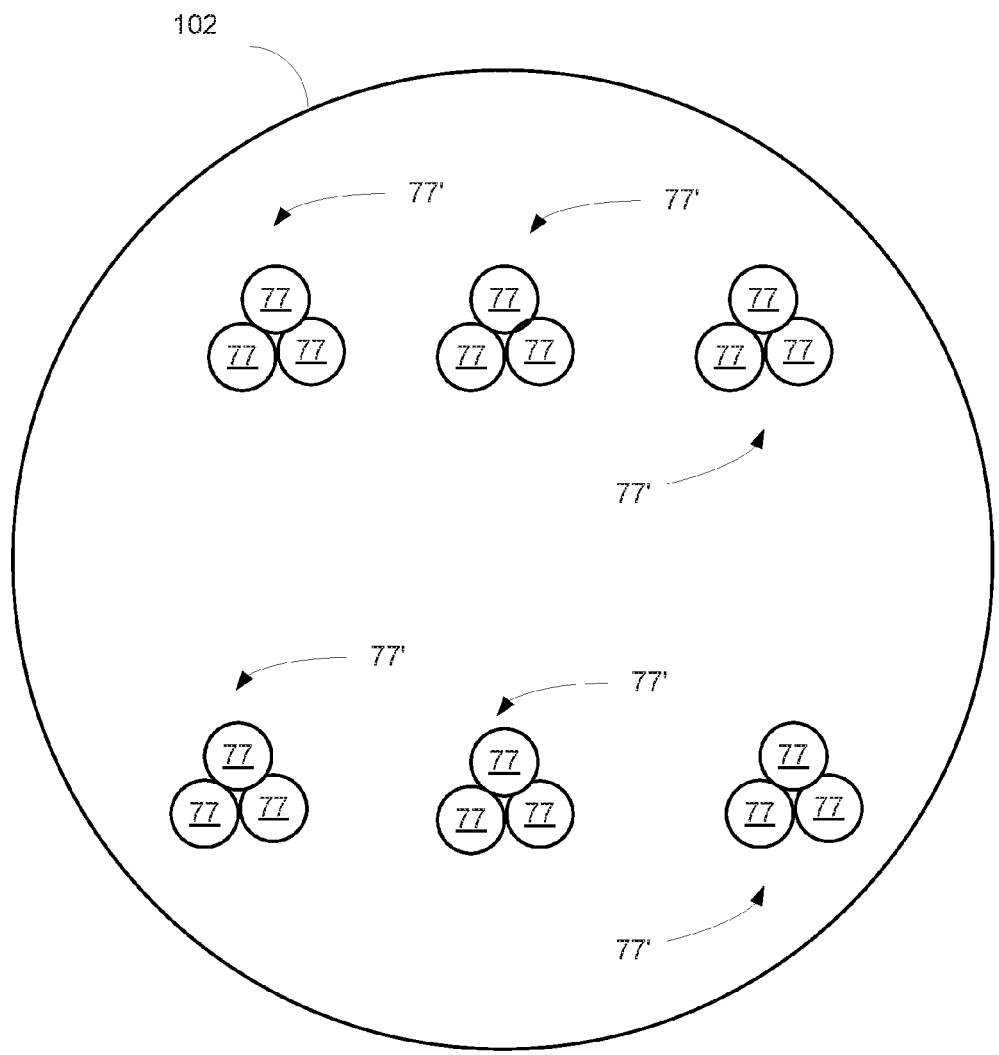
FIG. 7 is a top view of a silo and multiple acoustic transceiver arrays of system mounted on the ceiling of the silo according to an embodiment of the invention.

FIGS. 5-7 are top views of a silo and multiple acoustic transceiver arrays of system mounted on the ceiling of the silo according to various embodiment of the invention.

FIG. 5 illustrates five spaced apart acoustic transceiver arrays 77' that include acoustic transceivers 77—one being positioned at a center of the silo 100 and four other acoustic transceiver arrays 77' are arranged at a fixed distance from the center of the silo in a symmetrical manner.

FIG. 6 illustrates three spaced apart acoustic transceiver arrays 77' that are positioned at a fixed distance from the center of the silo in a symmetrical manner.

FIG. 7 illustrates six spaced apart acoustic transceiver arrays 77' that are positioned in two rows.

Figure 8:
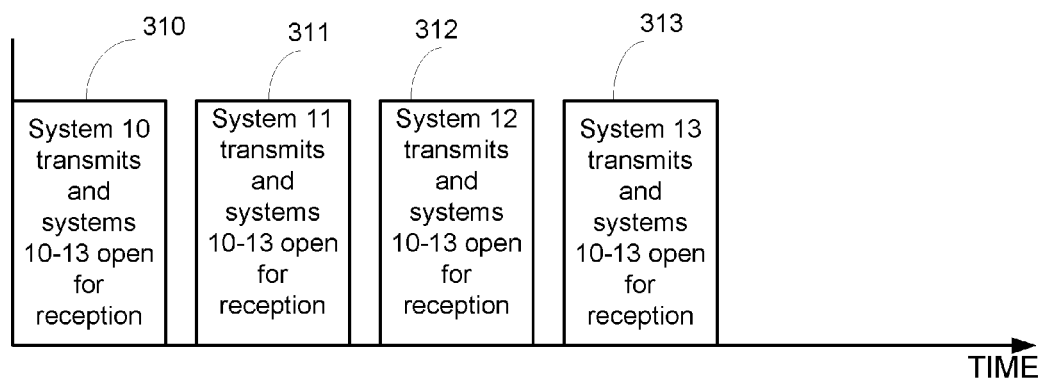
FIG. 8 is a timing diagram according to an embodiment of the invention.

FIG. 8 is a timing diagram 300 according to an embodiment of the invention.

FIG. 8 illustrates four non-overlapping time slots 310, 311, 312 and 313 according to an embodiment of the invention.

During each time slot only one detection system transmits an acoustic pulse while all detection systems are open for receiving echoes of that acoustic pulse. It is noted that during one or more time slots only a part of the detection systems can be open for reception.

The order of transmission can change over time and may differ from the order illustrated in FIG. 8. The time slots can be evenly or unevenly distributed between the acoustic transceiver arrays.

Figure 9:
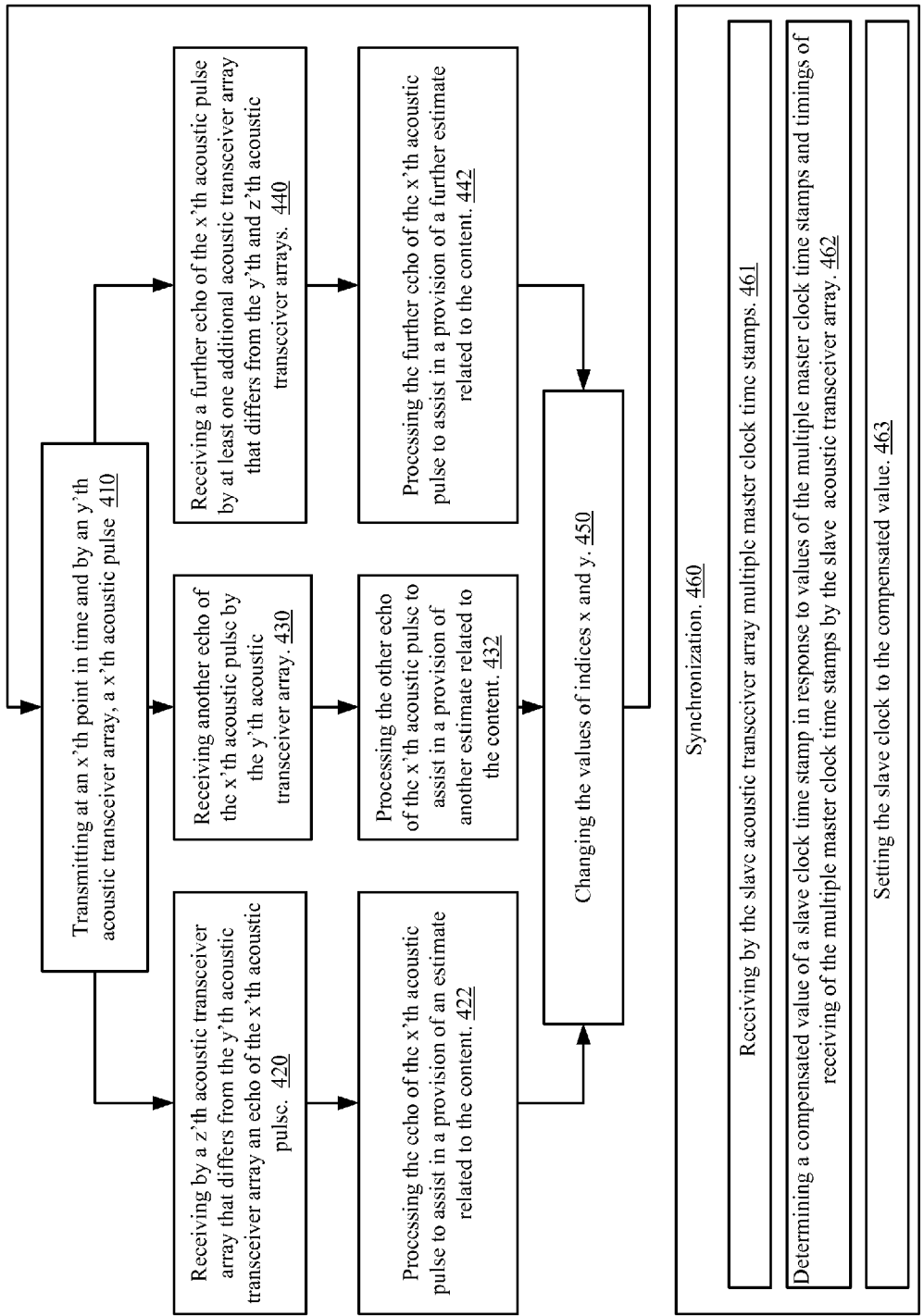
FIG. 9 illustrates a method according to an embodiment of the invention.

FIG. 9 illustrates a method 400 according to an embodiment of the invention.

The following method describes sequences that includes a transmission of an acoustic pulse by a single acoustic transceiver array and a reception (or at least an attempt of reception) of echoes of that acoustic pulse. It is expected that multiple echoes are received. The processing of the echoes can provide an estimate relating to the content of the bin. This estimate can be an estimate of a certain area or point of the upper surface of the content of the bin, can be an estimate of a presence of an obstacle (see, for example obstacle 101 of FIG. 1), can be an estimate of multiple areas and/or multiple points of the upper surface of the bin, a mapping of the upper surface of the bin and even the volume of the content. Typically the estimate of the content of the bin requires multiple transmissions of multiple acoustic pulses over time. The estimates can be provided by each acoustic detection device, by collaboration between multiple acoustic detection devices, by a controller (or any other entity) that receives initial estimates from one or more acoustic detection devices, by collaboration between such a controller and one or more acoustic detection devices.

The following text refers to multiple estimates. These estimates can stand alone, be merged or otherwise further processed to provide a final estimate. A stage of processing an echo may include (a) determining characteristics of the echo (such as degree of arrival, signal to noise ratio, amplitude), (b) determining a location of a reflecting point or area of the surface that reflected the echo, (c) evaluating a reliability level of the estimation of the location of the reflecting point or area, (d) estimating a shape of the content. Each one of the determinations (a)-(d) or any other type of determination can be regarded as an estimate relating to the content.

The determination of a location of a reflecting point that belongs to the upper content of the surface and was reflected an acoustic pulse transmitted from a first acoustic transceiver array and received by a second acoustic transceiver arrays can be based upon geometrical relationships and is determined in response to (a) spatial relationship between the first and second acoustic transceiver arrays, to (ii) a time gap between a transmission of the first acoustic pulse and the reception of the echo of the first acoustic transceiver array, and to (iii) a direction (ALPHA) of arrival of the echo to the second acoustic transceiver array. Assuming that the first and second acoustic transceiver arrays and the reflecting points are virtually linked by an imaginary triangle than the first edge E1 virtually links between the first and second acoustic transceiver arrays, the sum (Es) of lengths of the second and third edges E2 and E3 virtually linking the second and first acoustic transceiver arrays to the reflecting point is represented by the time gap (time gap=(E2+E3)/V), wherein V is the propagation velocity of acoustic signals in air, and the angle between E1 and E2 is provided the direction of arrival of the echo.

The relationships between E1, E2, E3 and ALPHA can be given by the following equation, based upon the relationship between angles and edges of the virtual triangle: $E3^2=E2^2-E1^2+2*E1*E2*\mathrm{Cosine}(ALPHA)$ Es, ALPHA and E1 are known—Es is calculated in response to the time gap and V, E1 is known as the locations of the first and second acoustic transceiver arrays is known and ALPHA is the angle of transmission of the acoustic pulse from the first acoustic transceiver array and is also known. Accordingly—E3 (the distance between the second transceiver array and the reflecting point) can be extracted:

$$E3^2=(Es-E3)^2-E1^2+2*E1*(Es-E3)*\mathrm{Cosine}(ALPHA)$$

Referring back to FIG. 9—method 400 starts by stage 410 of transmitting at an x'th point in time and by an y'th acoustic transceiver array, an x'th acoustic pulse towards an expected location of the content.

Indices x and y are positive integers. The value of index x is used to represent point in times—and especially denotes transmission time slots (such as 310, 311, 312 and 313). The value of index y ranges between 1 and Y, Y being the number of acoustic transceiver arrays per system (Y equals or exceeds two). The different acoustic transceivers arrays are spaced apart from each other.

Index x can be initialized (during the first iteration of stage 410) to one. Index y is set according to the allocation of time slots to the different acoustic transceiver arrays.

Stage 410 may be followed by one or more of stages 420, 430 and 440.

Stage 420 includes receiving by a z'th acoustic transceiver array that differs from the y'th acoustic transceiver array an echo of the x'th acoustic pulse. Index z ranges between 1 and Y.

Stage 420 may be followed by stage 422 of processing the echo of the x'th acoustic pulse to assist in a provision of an estimate related to the content.

Stage 430 includes receiving another echo of the x'th acoustic pulse by the y'th acoustic transceiver array.

Stage 430 may be followed by stage 432 of processing the other echo of the x'th acoustic pulse to assist in a provision of another estimate related to the content.

Stage 440 includes receiving a further echo of the x'th acoustic pulse by at least one additional acoustic transceiver array that differs from the y'th and z'th acoustic transceiver arrays. Stage 440 may be executed if the system includes more than two acoustic transceiver arrays and if one or more additional acoustic transceivers receives an echo of the x'th acoustic pulse.

Stage 440 may be followed by stage 442 of processing the further echo of the x'th acoustic pulse to assist in a provision of a further estimate related to the content.

Stages 422, 432 and 442 may be followed by stage 450 of changing the values of indices x and y. Index x can be increased by one. Index y is changes to comply with the next acoustic transceiver array that is scheduled to transmit. Stage 450 is followed by stage 410.

Once for one or more iterations of stages 410, 420 and 430 the method can perform a timing calibration process—which is represented by synchronization stage 460. In order to prevent the parallel transmission of acoustic pulses by different acoustic transceiver arrays the different acoustic transceiver arrays should be at least partially synchronized. Time mismatches should be reduced in order to facilitate an efficient transmission of pulses—without lengthy silent periods between transmissions.

The synchronization stage 460 can include synchronizing one or more clocks of one or more acoustic transceiver arrays to a master clock. The master clock can be a clock of one of the acoustic transceiver arrays or a clock of another entity such as a controller that controls the acoustic transceiver arrays.

A slave acoustic transceiver array that executes stage 460 may execute the following stages:
a. Receiving (461) by the slave acoustic transceiver array multiple master clock time stamps.
b. Determining (462) a compensated value of a slave clock time stamp (of a slave clock of the slave acoustic transceiver array) in response to values of the multiple master clock time stamps and timings of receiving of the multiple master clock time stamps by the slave acoustic transceiver array; and
c. Setting (463) the slave clock to the compensated value.

The compensating may include calculating by the certain acoustic transceiver array a gap between a rate of the slave clock and a rate of the master clock in response to the multiple master clock time stamps and in response to the timings of the receiving of the multiple master clock stamps.

For a non-limiting example, the time gaps allowed between clocks of different acoustic transceiver arrays can be about five microseconds and the clock accuracy of each acoustic transceiver array may be about 100 ppm—i.e. up to 100 microseconds drift per second. One per few minutes a master can broadcast master time stamps to all acoustic transceiver arrays. The transmission can be made by wire or wireless means. For example, it can be made using a RS485 multidrop protocol that connects all the acoustic detection devices.

Definitions $CM(t[n])$—the master clock at time $t[n]$ ($n=0, 1, 2, \ldots$)
$CS(t[n])$—the slave clock at time $t[n]$
The slave correction to the master clock at time $t[n]$ is given by:

$$C1 = CM(t[n]) - CS(t[n])$$

The slave estimation of its clock drift relatively to the Master clock is:

$$C2 = ((CM(t[n]) - CS(t[n])) - (CM(t[n-1]) - CS(t[n-1])))/(t[n]-t[n-1])$$

The slave clock compensation value $CM(t')$ (Executed at slave clock timestamp $t'>t[n]$, assuming $t[n]$ is the last received transmission from master prior to $t'[n]$) will be given by:

$$CM(t') \sim CS(t') + C1 + C2*(t'-t[n])$$

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for evaluating a content of a bin, the method comprising:
    transmitting at a first point in time and by a first acoustic transceiver array, a first acoustic pulse; wherein the first acoustic transceiver array comprises transducers;
    receiving by a second acoustic transceiver array an echo of the first acoustic pulse; wherein the second acoustic transceiver array comprises transducers; and
    processing the echo of the first acoustic pulse to assist in a provision of a first estimate related to the content;
    wherein the second acoustic transceiver array differs from the first acoustic transceiver array; and
    wherein a distance between the first and second acoustic transceiver array is (a) at least ten times a distance between centers of the transducers of the second acoustic transceiver array; and (b) at least ten times a distance between centers of the transducers of the first acoustic transceiver array.

2. The method according to claim 1 comprising: receiving another echo of the first acoustic pulse by the first acoustic transceiver array; and processing the other echo of the first acoustic pulse to assist in a provision of a second estimate related to the content.

3. The method according to claim 1 further comprising: transmitting at a second point in time and by the second acoustic transceiver array, a second acoustic pulse towards the expected location of the content; wherein the second point in time differs from the first point in time; receiving by the first acoustic transceiver array an echo of the second acoustic pulse; and processing the echo of the second acoustic pulse to assist in a provision of a third estimate related to the content.

4. The method according to claim 1 comprising: receiving another echo of the first acoustic pulse by at least one additional acoustic transceiver array; and processing the other echo of the first acoustic pulse to assist in a provision of a fourth estimate related to the content.

5. The method according to claim 1 wherein the first estimate is an estimate of a location of a first reflecting point that (a) belongs to an upper surface of the content and (b) reflected the first acoustic pulse; wherein the processing comprises estimating the location of the first reflecting point in response to (i) a spatial relationship between the first and second acoustic transceiver arrays, to (ii) a time gap between a transmission of the first acoustic pulse and the reception of the echo of the first acoustic transceiver array, and to (iii) a direction of arrival of the echo to the second acoustic transceiver array.

6. The method according to claim 1 comprising compensating for clock differences between a second clock of the second acoustic transceiver array and a master clock.

7. The method according to claim 6 wherein the compensating comprises: receiving by the second acoustic transceiver array multiple master clock time stamps; determining a compensated value of a second clock time stamp in response to values of the multiple master clock time stamps and timings of receiving of the multiple master clock time stamps; and setting the second clock to the compensated value.

8. The method according to claim 7 wherein the compensating comprises calculating by the second acoustic transceiver array a gap between a rate of the second clock and a rate of the first clock in response to the multiple master clock time stamps and in response to the timings of the receiving of the multiple master clock stamps.

9. The method according to claim 1 wherein an upper surface of the content is expected to be located within a far field of each one of the first and second transceiver arrays.

10. The method according to claim 1 wherein the first acoustic pulse has a shape of a lobe that is more that forty degrees wide.

11. A system for evaluating a content of a bin, the system comprises:
   a first acoustic transceiver array that is arranged to transmit at a first point in time a first acoustic pulse towards an expected location of the content wherein the first acoustic transceiver array comprises transducers;
   a second acoustic transceiver array that is arranged to receive an echo of the first acoustic pulse; wherein the second acoustic transceiver array comprises transducers;
   wherein the second acoustic transceiver array differs from the first acoustic transceiver array;
   wherein a distance between the first and second acoustic transceiver array is (a) at least ten times a distance between centers of the transducers of the second acoustic transceiver array; and (b) at least ten times a distance between centers of the transducers of the first acoustic transceiver array, and
   wherein the second acoustic transceiver array is arranged to process the echo of the first acoustic pulse to assist in a provision of a first estimate related to the content.

12. The system according to claim 11 wherein the first acoustic transceiver array is arranged to receive another echo of the first acoustic pulse and to process the other echo of the first acoustic pulse to assist in a provision of a second estimate related to the content.

13. The system according to claim 11 wherein the second acoustic transceiver array is arranged to transmit at a second point in time a second acoustic pulse; wherein the second point in time differs from the first point in time; wherein the first acoustic transceiver array is arranged to receive an echo of the second acoustic pulse and process the echo of the second acoustic pulse to assist in a provision of a third estimate related to the content.

14. The system according to claim 13 comprising at least one additional acoustic transceiver array that is arranged to receiving another echo of the first acoustic pulse; and process the other echo of the first acoustic pulse to assist in a provision of a fourth estimate related to the content.

15. The system according to claim 11 wherein the first estimate is an estimate of a location of a first reflecting point that (a) belongs to an upper surface of the content and (b) reflected the first acoustic pulse; wherein the first acoustic transceiver array is arranged to assist in an estimation of the location of the first reflecting point in response to (i) a spatial relationship between the first and second acoustic transceiver arrays, to (ii) a time gap between a transmission of the first acoustic pulse and the reception of the echo of the first acoustic transceiver array, and to (iii) a direction of arrival of the echo to the second acoustic transceiver array.

16. The system according to claim 11 wherein the second acoustic transceiver array is arranged to compensate for clock differences between a second clock of the second acoustic transceiver array and a master clock.

17. The system according to claim 16 wherein the second acoustic transceiver array is arranged to receiving by the second acoustic transceiver array multiple master clock time stamps; determine a compensated value of a second clock time stamp in response to values of the multiple master clock time stamps and timings of receiving of the multiple master clock time stamps; and set the second clock to the compensated value.

18. The system according to claim 17 wherein the second acoustic transceiver array is arranged to calculate a gap between a rate of the second clock and a rate of the first clock in response to the multiple master clock time stamps and in response to the timings of the receiving of the multiple master clock stamps.

19. The system according to claim 16 wherein the master clock is generated by a controller is coupled to the first and second acoustic transceiver arrays.

20. The system according to claim 11 wherein an upper surface of the content is expected to be located within a far field of each one of the first and second transceiver arrays.

21. The system according to claim 11 comprising a controller that is arranged to receive the first and second estimates related to the content and to provide an updated estimate related to the content.

22. The system according to claim 11 wherein the first acoustic pulse has a shape of a lobe that is more that forty degrees wide.

* * * * *